United States Patent [19]

Pippa et al.

[11] 4,357,270

[45] Nov. 2, 1982

[54] PROCESS FOR THE AGGLOMERATION OF RUBBER LATEXES

[75] Inventors: Roberto Pippa, Noale; Andrea De Toffol, Cerro Maggiore; Agostino Lepori, Fagnano Olona; Luigi Mara, Castellanza, all of Italy

[73] Assignee: Montedison S.p.A., Milan, Italy

[21] Appl. No.: 210,729

[22] Filed: Nov. 26, 1980

[30] Foreign Application Priority Data

Nov. 27, 1979 [IT] Italy ................................ 27574 A/79

[51] Int. Cl.$^3$ ............................................. C08L 7/02
[52] U.S. Cl. .................................. 523/335; 528/494; 524/375; 524/501
[58] Field of Search .................. 260/29.7 UA, 29.7 E, 260/29.7 PT; 528/494

[56] References Cited

U.S. PATENT DOCUMENTS

| | | | |
|---|---|---|---|
| 3,892,700 | 7/1975 | Burke | 260/29.7 UA |
| 4,187,202 | 2/1980 | Kondo | 260/29.7 UA |

*Primary Examiner*—Joseph L. Schofer
*Assistant Examiner*—N. Sarofim

[57] ABSTRACT

Rubbery polymer latexes are agglomerated by mixing them with another latex containing:

(1) a polymer, different from that present in the latex to be agglomerated and less lipophilic than the latter, selected from (a) homopolymers of alkyl acrylates and methacrylates in which the alkyl has from 1 to 12 carbon atoms, and (b) copolymers of ethylenically unsaturated monomers capable of forming water-insoluble homopolymers, and (2) a non-ionic surfactant consisting of an addition product of ethylene oxide.

The agglomerating latex is added in quantities corresponding to 0.1–20 parts by weight of solid polymer and to 0.0001–0.2 parts by weight of surfactant per 100 parts by weight of the rubbery polymer present in the latex to be agglomerated.

A particular use of the agglomerated rubbery polymer latexes is in the production of ABS resins.

19 Claims, No Drawings

PROCESS FOR THE AGGLOMERATION OF RUBBER LATEXES

BACKGROUND OF THE INVENTION

In order to achieve a remarkable economy in the preparation of aqueous dispersions of rubbery polymers, in general the polymerization of the monomers is carried out at rather high rates corresponding to relatively short polymerization times (e.g., from 6 to 12 hours). By this method, there are obtained latexes whose particles have a mean diameter below 2,000 Å (in general between 500 and 1,200 Å); the latexes of this type, having a solids content equal to or greater than 60% by weight, have the disadvantage, among others, of a high viscosity with consequent difficulty in handling.

Moreover, it is known that in some applications, for instance in the production of ABS resins, the latexes with polymeric particles below 2,000 Å do not give satisfactory results inasmuch as the ABS resins obtained therefrom do not show good characteristics of impact resistance and superficial aspect, for which it is necessary to have at disposal, as an intermediate, a polybutadiene latex whose particles, at least in part, will have a mean diameter of not less than 2,000 Å, and preferably between 3,000 and 7,000 Å. To obtain such a latex there are used techniques that are characterized by low reaction rates and rather long polymerization times (from 40 to 70 hours).

In order to avoid such burdensome techniques, it has been suggested to conduct the polymerization in a short time and to increase the diameter of a portion of the polymeric particles by means of a suitable agglomeration process which, in general, is carried out after the polymerization, but which may also be carried out towards the end of the polymerization.

In order to increase the diameter of at least a portion of the polymeric particles of a latex there have been devised various techniques, such as for instance:

freezing;

the passage of the latex, under pressure, through suitable orifices of a very small diameter;

addition of electrolytes, organic solvents or water-soluble polymers such as polyvinyl alcohol, polyvinylmethylether, polymers of alkylene oxides, and so on, or the addition of latexes of copolymers containing a small percentage of ethylenically unsaturated monomers forming water-soluble homopolymers.

Those techniques have considerable disadvantages, such as a high consumption of energy (for instance in the case of the freezing technique), the probable formation of heavy quantities of coagulum, a rather low limit of the maximum size of the agglomerated polymeric particles, a strong dependence of the agglomeration on temperature and time, mechanical instability of the agglomerated latex, and difficulties in controlling and reproducing the distribution of the size of the agglomerated particles.

THE PRESENT INVENTION

An important object of the present invention is to provide an improved process for the agglomeration of rubber latexes, that is for increasing the size of the particles of a rubbery polymer in an aqueous dispersion.

Another and more specific object is to provide an improved process for the agglomeration of rubbers derived from diene monomers.

These and other objects are achieved by the present invention, in accordance with which we have discovered, surprisingly, that it is possible to effect the agglomeration of a latex of a rubbery polymer without meeting with the above-mentioned drawbacks, by adding to the latex to be agglomerated an agglomerating latex containing (1) a polymer, different from that present in the latex to be agglomerated and less lipophilic than the latter, selected from: (a) homopolymers of alkyl acrylates and methacrylates in which the alkyl has from 1 to 12 carbon atoms, and (b) copolymers of ethylenically unsaturated monomers capable of forming water-insoluble homopolymers, and (2) a non-ionic surfactant consisting of an addition product of ethylene oxide, the agglomerating latex being added in a quantity corresponding to 0.1–20 parts by weight of solid polymer and to 0.0001–0.2 parts by weight of surfactant per 100 parts by weight of the rubbery polymer present in the latex to be agglomerated. For the purposes of agglomeration even much higher quantities of polymer and surfactant could be added, but in such a case there would be changes in the chemical, physical and mechanical characteristics of the product obtained.

Examples of latexes to be agglomerated are those containing homo- or copolymers deriving from butadiene, isoprene, styrene, alpha-methylstyrene, vinyltoluenes, acrylonitrile, and alkyl esters of acrylic, methacrylic, maleic, fumaric, crotonic and itaconic acid in which the alkyl has from 1 to 12 carbon atoms. Of particular interest are the latexes of polybutadiene, of copolymers of butadiene with styrene and/or with acrylonitrile and of graft copolymers derived from polybutadiene and from ethylenically unsaturated water-insoluble monomers such as styrene, alpha-methylstyrene, acrylonitrile, butyl acrylate, methylmethacrylate, and 2-ethylhexyl acrylate, said graft copolymers being capable of containing also comonomers with two double bonds exerting a crosslinking action, such as, for instance, divinylbenzenes or alkylene diacrylates.

Said latexes are prepared by the known technique of emulsion polymerization, in the presence of an anionic emulsifier and of a radical initiator, and have a polymer content from 10 to 60% by weight.

Examples of polymers present in the agglomerating latex are butyl polyacrylate and the copolymers deriving from the following monomers: butadiene, isoprene, styrene, alphamethylstyrene, acrylonitrile, methacrylonitrile, vinyltoluenes and alkyl esters of acrylic or methacrylic acid in which the alkyl has from 1 to 12 carbon atoms.

Particularly interesting are the copolymers of butadiene with a monomer selected from styrene, acrylonitrile, butyl or ethyl acrylate and methylmethacrylate. The corresponding latexes are likewise prepared by emulsion polymerization and have a polymer content from 10 to 50% by weight; it is possible to vary the size of the particles of such a polymer by varying the quantity of the anionic emulsifier used in the polymerization.

As a polymer of the agglomerating latex there may also be used a graft copolymer obtained, for instance, from polybutadiene, styrene and acrylonitrile.

The non-ionic surfactants consisting of addition products of ethylene oxide are the known adducts of ethylene oxide with various organic compounds containing in the molecule reactive hydrogen atoms, such as alkylphenols having from 8 to 12 carbon atoms in the alkyl, aliphatic alcohols having from 12 to 18 carbon atoms, long chain fatty acids and alicyclic carboxylic acids of the type of abietic acid, tall oil, esters of long chain fatty acids, such as mono- and diglycerides, castor oil and esters of 1,4-sorbitan. The number of ethylene oxide molecules present in the molecule of the adduct varies, in general, from 10 to 100; but may also be greater.

As non-ionic surfactants there may also be used ethylene oxide/propylene oxide copolymers containing a percentage by weight of ethylene oxide comprised between 30 and 95%.

As examples of non-ionic surfactants there may be cited the addition products of nonylphenol with 9, 20, 40 and 100 moles of ethylene oxide, the addition product of oleic alcohol with 55 moles of ethylene oxide and the addition product of 1,4-sorbitan-stearate with 20 moles of ethylene oxide. Of particular interest are the adducts of nonylphenol with more than 20 moles of ethylene oxide.

To carry out the agglomeration it suffices to add, under stirring, to the latex of the rubbery polymer the agglomerating latex containing the polymer and the non-ionic surfactant, at a temperature higher than the glass transition temperature of the polymer to be agglomerated.

The agglomeration may be considered achieved after a very short time and a stable equilibrium is attained within less than 10 minutes.

A satisfactory agglomeration is achieved only when to the latex to be agglomerated there is added the latex of the agglomerating polymer added with the non-ionic surfactant (this latter may also be added to the agglomerating latex during its preparation). In fact, no agglomeration is observed if to the latex of the rubbery polymer there is added a latex containing only the agglomerating polymer, while if there is added only an aqueous solution of the surfactant or if there are separately added, in any order, the latex of the agglomerating polymer and the solution of the surfactant, there will be observed a very modest agglomerating effect (Table I, infra).

It is necessary, therefore, to add the surfactant to the latex of the agglomerating polymer and then add, under stirring, the latex thus treated to the latex to be agglomerated. It must be noted that the surfactant is absorbed on the surface of the particles of the polymer present in the agglomerating latex, and that also at the moment of the mixing together of the two latexes it is necessary that the surfactant remains preferentially anchored on the polymer of the agglomerating latex. In order to achieve such a condition, the polymer of the agglomerating latex is chosen in such a way as to have a lipophilic character less marked than that of the rubbery polymer present in the latex to be agglomerated.

By maintaining unchanged the quantity of the polymer of the agglomerating latex and the quantity of surfactant present in it, it is possible to vary (from 2,000 to 15,000 Å) the diameter of the agglomerated particles by varying suitably (from 1,000 to 4,000 Å) the diameter of the particles of the agglomerating latex (Table II infra). With monomodal agglomerating latexes having a restricted size distribution of the particles there are obtained bimodal agglomerated latexes, while with polymodal agglomerating latexes or suitable mixtures of monomodal agglomerating latexes there are obtained agglomerated latexes with a wide and controlled distribution of the particle size.

Since the agglomeration is not influenced by the presence of small quantities of unreacted monomers, it may be effected also during the final phase of the polymerization of the latex to be agglomerated, that is when there has been achieved a conversion of at least 60%.

The viscosity of a rubber latex is so much the higher the higher its concentration and the smaller its polymeric particles. After the agglomeration, there is observed a considerable decrease of the viscosity of the latex. In this way it is possible to have at disposal latexes with a high solids content and with a relatively low viscosity.

The agglomerating action is so much the stronger the higher the surface tension of the latex to be agglomerated.

The agglomeration lowers also the surface tension of the rubber latex. The lowering is due to the fact that, in consequence of the agglomeration, the total surface of the polymeric particles decreases and consequently there becomes disposable a certain portion of the anionic surfactant present in the latex itself.

It has been ascertained that the agglomeration process of this invention and described above does not cause a labile aggregation of the rubber particles, but an agglomeration of a stable and irreversible type. It can be used advantageously in the production of ABS resins with excellent characteristics of impact resistance and of good surface appearance.

The following examples, reported in Tables from I to VI, are given to illustrate the invention in more detail and are not intended to be limiting.

Examples 1 and 2 (Table I) are comparative examples. The various tests were carried out at room temperature.

Meaning of the symbols used in the Tables:
(A)=polymer of the latex to be agglomerated;
(B)=polymer of the agglomerating latex;
(C)=non-ionic surfactant;
TS=surface tension;
b.w.=by weight.

$D_{10}$, $D_{50}$, $D_{90}$ indicate, respectively, the cumulative diameters of the polymeric particles constituting the fraction of 10, 50 and 90% by volume: thus, for instance, a value of 1,000 Å for $D_{50}$ indicates that all the particles with a diameter $D \leq 1,000$ Å constitute 50% by volume of the total of the particles.

The whole of the values $D_{10}$, $D_{50}$, $D_{90}$ gives an indication of the distribution of the diameters of the polymeric particles. Said values are obtained, as is known, from the "cumulative curve" which is obtained by placing on the abscissa the cumulative diameters D, expressed for instance in Ångstrom units, and on the ordinate the corresponding percentages by volume.

The visualization of the latex particles was achieved by means of transmission electronic microscopy.

The diameters of the particles were measured by counting with a Zeiss TGZ 3-image analyzer.

PB=polybutadiene;
BS=butadiene/styrene copolymer with 72% b.w. of butadiene;
BN=butadiene/acrylonitrile copolymer with 67% b.w. butadiene;
AB=butyl polyacrylate;
AB-ST=butyl acrylate/styrene copolymer with 83% b.w. of butyl acrylate;
AE=ethyl polyacrylate;
AM=methyl polyacrylate;

ABS = graft copolymer of styrene+acrylonitrile on polybutadiene, having a b.w. ratio polybutadiene/styrene/acrylonitrile equal to 52:36:12;

α-SAN = α-methyl-styrene/acrylonitrile copolymer with 71% b.w. of α-methylstyrene;

AE-AN = ethyl acrylate/acrylonitrile copolymer with 65% b.w. of ethyl acrylate;

$c_1$ = addition product of nonylphenol with 100 moles of ethylene oxide;

$c_2$ = addition product of nonylphenyl with 40 moles of ethylene oxide;

$c_3$ = addition product of nonylphenol with 20 moles of ethylene oxide;

$c_4$ = addition product of nonylphenol with 9 moles of ethylene oxide;

$c_5$ = addition product of castor oil with 200 moles of ethylene oxide;

$c_6$ = addition product of oleic alcohol with 55 moles of ethylene oxide;

$c_7$ = addition product of (1) a mixture of monovalent aliphatic alcohols containing 64–75% b.w. of stearyl alcohol and 22–30% b.w. of cetyl alcohol besides much smaller quantities of alcohols with 10, 12, 14, 20 and 22 carbon atoms, with (2) ethylene oxide in the molar ratio 1:25;

$c_8$ = addition product of sorbitan-stearate with 20 moles of ethylene oxide;

$c_9$ = ethylene oxide/propylene oxide copolymer with 80% b.w. of ethylene oxide, having a mean molecular weight of about 8,000.

TABLE I

Effect of the manner of adding an agglomerating system to a polybutadiene latex

| Ex. No. | Latex of (A) (A) | Latex of (A) TS dine/cm | Latex of (A) $D_{50}$ Å | Latex of (B) (B) | Latex of (B) $D_{50}$ Å | Latex of (B) % | Surfactant (C) Type | Surfactant (C) % on (A) | Agglomerated Latex Agglomerated Particles Distribution Å | Agglomerated Latex % by volume | Agglomerated Latex TS dine/cm |
|---|---|---|---|---|---|---|---|---|---|---|---|
| 1* | PB | 68.4 | 1000 | AB | 870 | 3 | $C_1$ | 0.07 | $D_{10}$ 1900 $D_{50}$ 2850 $D_{90}$ 3600 | 11 | 65 |
| 2** | PB | 68.4 | 1000 | AB | 870 | 3 | $C_1$ | 0.07 | $D_{10}$ 1600 $D_{50}$ 4300 $D_{90}$ 4800 | 12 | 63 |
| 3*** | PB | 68.4 | 1000 | AB | 870 | 3 | $C_1$ | 0.07 | $D_{10}$ 2600 $D_{50}$ 3650 $D_{90}$ 6500 | 60 | 51 |

*To the latex of (A) there is added first the latex of (B) and then the surfactant (C).
**To latex of (A) there is first added the surfactant (C) and then the latex of (B).
***To latex of (A) there is added the latex of (B) containing the surfactant (C).

TABLE II

Effect of the size of the particles of a butyl polyacrylate latex on the agglomeration of a polybutadiene latex

| Ex. No. | (A) | Latex of (A) TS dine/cm | Latex of (A) Distribution Å | (B) | Latex of (B) Distribution Å | Latex of (B) % on (A) | Surfactant (C) Type | Surfactant (C) % on (A) | Agglomerated Latex Agglomerated Particles Distribution Å | Agglomerated Latex % vol. | Agglomerated Latex TS dine/cm |
|---|---|---|---|---|---|---|---|---|---|---|---|
| 4 | PB | 69 | $D_{10}$ 780 $D_{50}$ 900 $D_{90}$ 1030 | AB | $D_{10}$ 550 $D_{50}$ 660 $D_{90}$ 760 | 3 | $C_1$ | 0.07 | $D_{10}$ 2000 $D_{50}$ 2400 $D_{90}$ 2700 | 47 | 53 |
| 5 | PB | 68.4 | $D_{10}$ 870 $D_{50}$ 1000 $D_{90}$ 1100 | AB | $D_{10}$ 800 $D_{50}$ 870 $D_{90}$ 940 | 3 | $C_1$ | 0.07 | $D_{10}$ 2600 $D_{50}$ 3650 $D_{90}$ 6500 | 60 | 51 |
| 6 | PB | 68.4 | $D_{10}$ 870 $D_{50}$ 1000 $D_{90}$ 1100 | AB | $D_{10}$ 1250 $D_{50}$ 1400 $D_{90}$ 1500 | 3 | $C_1$ | 0.07 | $D_{10}$ 4600 $D_{50}$ 6000 $D_{90}$ 8000 | 78 | 50 |
| 7 | PB | 68.4 | $D_{10}$ 870 $D_{50}$ 1000 $D_{90}$ 1100 | AB | $D_{10}$ 3100 $D_{50}$ 3300 $D_{90}$ 3450 | 3 | $C_1$ | 0.07 | $D_{10}$ 11300 $D_{50}$ 12400 $D_{90}$ 13200 | 90 | 48 |
| 8 | PB | 69 | $D_{10}$ 780 $D_{50}$ 900 $D_{90}$ 1030 | AB | $D_{10}$ 500 $D_{50}$ 1900 $D_{90}$ 3000 | 3 | $C_1$ | 0.07 | $D_{10}$ 2400 $D_{50}$ 5000 $D_{90}$ 6850 | 92 | 47 |

TABLE III

Effect of the percentage of butyl polyacrylate on the agglomeration of a polybutadiene latex

| Ex. No. | (A) | Latex of (A) TS dine/cm | Latex of (A) Distribution Å | (B) | Latex of (B) Distribution Å | Latex of (B) % on (A) | Surfactant (C) Type | Surfactant (C) % on (A) | Agglomerated latex Agglomerated Particles Distribution Å | Agglomerated latex % vol. |
|---|---|---|---|---|---|---|---|---|---|---|
| 9 | PB | 68.4 | $D_{10}$ 870 $D_{50}$ 1000 $D_{90}$ 1100 | AB | $D_{10}$ 1080 $D_{50}$ 1200 $D_{90}$ 1300 | 2 | $C_1$ | 0.05 | $D_{10}$ 5400 $D_{50}$ 6600 $D_{90}$ 8300 | 70 |
| 10 | PB | 68.4 | $D_{10}$ 870 $D_{50}$ 1000 $D_{90}$ 1100 | AB | $D_{10}$ 1080 $D_{50}$ 1200 $D_{90}$ 1300 | 20 | $C_1$ | 0.05 | $D_{10}$ 2800 $D_{50}$ 4400 $D_{90}$ 6400 | 86 |
| 11 | PB | 68.4 | $D_{10}$ 870 $D_{50}$ 1000 | AB | $D_{10}$ 1080 $D_{50}$ 1200 | 67 | $C_1$ | 1.5 | $D_{10}$ 2200 $D_{50}$ 2500 | 90 |

TABLE III-continued

Effect of the percentage of butyl polyacrylate on the agglomeration of a polybutadiene latex

| | Latex of (A) | | | Latex of (B) | | Surfactant (C) | | Agglomerated latex Agglomerated Particles | |
|---|---|---|---|---|---|---|---|---|---|
| Ex. No. | (A) | TS dine/cm | Distribution Å | (B) | Distribution Å | % on (A) | Type | % on (A) | Distribution Å | % vol. |
| | | | $D_{90}$ 1100 | | $D_{90}$ 1300 | | | | $D_{90}$ 4100 | |

TABLE IV

Effect of the quantity and of the type of surfactant (C) on the agglomeration of a polybutadiene latex with a butyl polyacrylate latex

| | Latex of (A) | | | Latex of (B) | | | Surfactant (C) | | Agglomerated latex | | |
|---|---|---|---|---|---|---|---|---|---|---|---|
| Ex. No. | (A) | TS dine/cm | $D_{50}$ Å | (B) | $D_{50}$ Å | % on (A) | Type | % on (A) | Agglomerated Particles $D_{50}$ Å | % vol. | TS dine/cm |
| 12 | PB | 69 | 800 | AB | 1400 | 3 | $C_1$ | 0.003 | 2600 | 17 | — |
| 13 | PB | 69 | 800 | AB | 1400 | 3 | $C_1$ | 0.03 | 5100 | 50 | — |
| 14 | PB | 69 | 800 | AB | 1400 | 3 | $C_1$ | 0.10 | 4650 | 85 | — |
| 15 | PB | 68.4 | 1000 | AB | 870 | 3 | $C_1$ | 0.07 | 3650 | 60 | 51 |
| 16 | PB | 68.4 | 1000 | AB | 870 | 3 | $C_2$ | 0.07 | 3350 | 39 | 53 |
| 17 | PB | 68.4 | 1000 | AB | 870 | 3 | $C_3$ | 0.07 | 2350 | 20 | 61 |
| 18 | PB | 68.4 | 1000 | AB | 870 | 3 | $C_4$ | 0.20 | 2000 | 5 | 63 |
| 19 | PB | 68.4 | 1000 | AB | 870 | 3 | $C_5$ | 0.07 | 2600 | 80 | 49 |
| 20 | PB | 68.4 | 1000 | AB | 870 | 3 | $C_6$ | 0.07 | 2500 | 72 | 50 |
| 21 | PB | 68.4 | 1000 | AB | 870 | 3 | $C_7$ | 0.07 | 2400 | 50 | 52 |
| 22 | PB | 68.4 | 1000 | AB | 870 | 3 | $C_8$ | 0.07 | 1800 | 10 | 59 |
| 23 | PB | 68.4 | 1000 | AB | 870 | 3 | $C_9$ | 0.20 | 2300 | 5 | 63 |

TABLE V

Effect of the type of polymer (B) on the agglomeration of a polybutadiene latex

| | Latex of (A) | | | Latex of (B) | | | Surfactant (C) | | Agglomerated Latex Agglomerated Particles | | |
|---|---|---|---|---|---|---|---|---|---|---|---|
| Ex. No. | (A) | TS dine/cm | $D_{50}$ Å | (B) | $D_{50}$ Å | % on (A) | Type | % on (A) | $D_{50}$ Å | % vol. | TS dine/cm |
| 24 | PB | 68.4 | 1000 | AB | 870 | 3 | $C_1$ | 0.07 | 3650 | 60 | 51 |
| 25 | PB | 68.4 | 1000 | BN | 1200 | 3 | $C_1$ | 0.07 | 3050 | 70 | 50 |
| 26 | PB | 68.4 | 1000 | AE | 800 | 3 | $C_1$ | 0.07 | 3850 | 60 | 53 |
| 27 | PB | 68.4 | 1000 | AM | 700 | 3 | $C_1$ | 0.07 | 5250 | 83 | 42 |
| 28 | PB | 68.4 | 1000 | ABS | 1100 | 3 | $C_2$ | 0.14 | 2000 | 15 | 65 |
| 29 | PB | 68.4 | 1000 | α-SAN | 600 | 3 | $C_2$ | 0.14 | 3500 | 14 | 64 |

TABLE VI

Examples of agglomeration of latexes of rubbers other than polybutadiene

| | Latex of (A) | | | Latex of (B) | | | Surfactant (C) | | Agglomerated Latex Agglomerated Particles | | |
|---|---|---|---|---|---|---|---|---|---|---|---|
| Ex. No. | (A) | TS dine/cm | $D_{50}$ Å | (B) | $D_{50}$ Å | % on (A) | Type | % on (A) | $D_{50}$ Å | % vol. | TS dine/cm |
| 30 | BS | 67 | 960 | AB | 1400 | 3 | $C_1$ | 0.03 | 3500 | 46 | 52 |
| 31 | BN | 47 | 1200 | AE-AN | 1100 | 3 | $C_1$ | 0.14 | 2250 | 18 | 44 |
| 32 | AB | 54 | 1000 | AE-AN | 1100 | 3 | $C_1$ | 0.14 | 2000 | 17 | 48 |
| 33 | AB-ST | 58.5 | 870 | AM | 700 | 3 | $C_5$ | 0.07 | 2300 | 41 | 47 |

What we claim is:

1. Process for agglomerating latexes of rubbery polymers characterized in that, to the latex to be agglomerated there is added, under stirring and at a temperature higher than the glass transition temperature of the polymer to be agglomerated, a previously prepared agglomerating latex containing (1) a polymer, other than that present in the latex to be agglomerated and less lipophilic than the latter, selected from (a) homopolymers of alkyl acrylates and methacrylates in which the alkyl has from 1 to 12 carbon atoms, and (b) copolymers of ethylenically unsaturated monomers capable of forming water-insoluble homopolymers, and selected from the group consisting of copolymers formed from acrylic or methacrylic alkyl esters wherein the alkyl group contains from 1 to 12 carbon atoms, with styrene or acrylonitrile or acrylonitrile with butadiene, styrene or methyl-styrene and (2) a non-ionic surfactant consisting of an addition product of ethylene oxide, the agglomerating latex being added in a quantity corresponding to 0.1-20 parts by weight of solid polymer and to 0.0001-0.2 parts by weight of surfactant per 100 parts by weight of the rubbery polymer present in the latex to be agglomerated.

2. The process of claim 1, in which the latex agglomerated is a polybutadiene latex.

3. The process of claim 1, in which the latex agglomerated is a latex of a butadiene-styrene copolymer.

4. The process of claim 1, in which the latex agglomerated is a latex of a butadiene-acrylonitrile copolymer.

5. The process of claim 1, in which the latex agglomerated is a latex of butyl polyacrylate.

6. The process of claim 1, in which the latex agglomerated is a latex of a butyl acrylate-styrene copolymer.

7. The process of claim 1, in which the polymer of the agglomerating latex is butyl polyacrylate.

8. The process of claim 1, in which the polymer of the agglomerating latex is a butadiene-acrylonitrile copolymer.

9. The process of claim 1, in which the polymer of the agglomerating latex is ethyl polyacrylate.

10. The process of claim 1, in which the polymer of the agglomerating latex is methyl polyacrylate.

11. The process of claim 1, in which the polymer of the agglomerating latex is a graft copolymer of styrene and acrylonitrile on polybutadiene.

12. The process of claim 1, in which the polymer of the agglomerating latex is an α-methylstyrene-acrylonitrile copolymer.

13. The process of claim 1, in which the polymer of the agglomerating latex is an ethylacrylate-acrylonitrile copolymer.

14. The process of claim 1, in which the non-ionic surfactant is an addition product of nonylphenol with ethylene oxide.

15. The process of claim 1, in which the non-ionic surfactant is an addition product of castor oil with ethylene oxide.

16. The process of claim 1, in which the non-ionic surfactant is an addition product of oleic alcohol with ethylene oxide.

17. The process of claim 1, in which the non-ionic surfactant is an addition product of ethylene oxide with a mixture of monovalent aliphatic alcohols prevailingly consisting of stearyl alcohol and cetyl alcohol and of small amounts of other alcohols having from 10 to 22 carbon atoms.

18. The process of claim 1, in which the non-ionic surfactant is an addition product of sorbitan-stearate with ethylene oxide.

19. The process of claim 1, in which the non-ionic surfactant is an ethylene oxide/propylene oxide copolymer containing from 30 to 95% by weight of ethylene oxide.

* * * * *